(12) United States Patent
Yang et al.

(10) Patent No.: US 9,984,272 B2
(45) Date of Patent: May 29, 2018

(54) PIXEL CIRCUIT, ITS DRIVING METHOD, LIGHT-EMITTING DIODE DISPLAY PANEL, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Feng Bai, Beijing (CN); Haisheng Wang, Beijing (CN); Yingming Liu, Beijing (CN); Renwei Guo, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 188 days.

(21) Appl. No.: 14/769,399

(22) PCT Filed: Jan. 6, 2015

(86) PCT No.: PCT/CN2015/070152
§ 371 (c)(1),
(2) Date: Aug. 20, 2015

(87) PCT Pub. No.: WO2016/045246
PCT Pub. Date: Mar. 31, 2016

(65) Prior Publication Data
US 2016/0253541 A1 Sep. 1, 2016

(30) Foreign Application Priority Data
Sep. 26, 2014 (CN) .......................... 2014 1 0505051

(51) Int. Cl.
*G09G 3/32* (2016.01)
*G06K 9/00* (2006.01)
(Continued)

(52) U.S. Cl.
CPC ............. *G06K 9/0002* (2013.01); *G09G 3/32* (2013.01); *G09G 3/3208* (2013.01);
(Continued)

(58) Field of Classification Search
None
See application file for complete search history.

(56) References Cited

U.S. PATENT DOCUMENTS 8,618,865 B1 12/2013 Lu
9,057,010 B2 6/2015 Rached
(Continued)

FOREIGN PATENT DOCUMENTS

CN 101937291 A 1/2011
CN 102890910 A 1/2013
(Continued)

OTHER PUBLICATIONS

International Search Report and Written Opinion in PCT International Application No. PCT/CN2015/070152, dated Jun. 18, 2015.
(Continued)

*Primary Examiner* — Antonio Xavier
(74) *Attorney, Agent, or Firm* — Brooks Kushman P.C.

(57) ABSTRACT

The pixel circuit includes a display driving module connected to a first scanning line, a second scanning line, a control line, a data line, a second signal source, a third signal source and an anode of an LED, and configured to, under the control of a first scanning signal, a second scanning signal and a control signal, compensate for a threshold voltage of a driving transistor using a data signal and a second signal, so that a light-emitting driving signal for the LED is irrel-
(Continued)

evant to the threshold voltage of the driving transistor; and a fingerprint identification module connected to the first scanning line, the second scanning line, a fourth signal source and a signal read line, and configured to, under the control of the first scanning signal and the second scanning signal, identify a fingerprint and detect a touch.

19 Claims, 7 Drawing Sheets

(51) Int. Cl.
  *G09G 3/3208* (2016.01)
  *G09G 3/3233* (2016.01)
(52) U.S. Cl.
  CPC ... *G09G 3/3233* (2013.01); *G09G 2300/0426* (2013.01); *G09G 2300/0819* (2013.01); *G09G 2300/0861* (2013.01); *G09G 2320/043* (2013.01); *G09G 2354/00* (2013.01)

(56) References Cited

U.S. PATENT DOCUMENTS

| | | | |
|---|---|---|---|
| 9,570,010 B2 * | 2/2017 | Yang | G09G 3/32 |
| 9,658,710 B2 * | 5/2017 | Yang | G09G 3/32 |
| 2002/0118150 A1 | 8/2002 | Kwon | |
| 2004/0174324 A1 | 9/2004 | Yamazaki et al. | |
| 2006/0108941 A1 | 5/2006 | Yang et al. | |
| 2007/0216657 A1 * | 9/2007 | Konicek | G06F 3/0412 345/173 |
| 2007/0273619 A1 | 11/2007 | Kitazawa et al. | |
| 2008/0030446 A1 * | 2/2008 | Asano | G09G 3/3233 345/87 |
| 2010/0097334 A1 | 4/2010 | Choi et al. | |
| 2011/0001711 A1 | 1/2011 | Choi et al. | |
| 2011/0063252 A1 * | 3/2011 | Chang | G06F 3/0412 345/175 |
| 2011/0169798 A1 | 7/2011 | Lee et al. | |
| 2012/0075229 A1 * | 3/2012 | Summers | G06F 3/044 345/173 |
| 2012/0195475 A1 * | 8/2012 | Abiko | G06T 7/00 382/115 |
| 2012/0287025 A1 * | 11/2012 | Inoue | G09G 3/3233 345/76 |
| 2013/0063398 A1 | 3/2013 | Ko et al. | |
| 2013/0069537 A1 | 3/2013 | Sun et al. | |
| 2014/0057562 A1 * | 2/2014 | Kurata | H04B 5/00 455/41.1 |
| 2014/0168127 A1 | 6/2014 | Yang | |
| 2014/0168157 A1 | 6/2014 | Yang | |
| 2014/0192035 A1 | 7/2014 | Tai et al. | |
| 2014/0210777 A1 | 7/2014 | Saito et al. | |
| 2014/0218327 A1 | 8/2014 | Shi et al. | |
| 2014/0291640 A1 * | 10/2014 | Miyake | H01L 27/3262 257/40 |
| 2015/0053947 A1 * | 2/2015 | Qing | G09G 3/3233 257/40 |
| 2015/0125725 A1 * | 5/2015 | Zhou | H01M 2/1055 429/90 |
| 2015/0177884 A1 | 6/2015 | Han | |
| 2015/0221255 A1 * | 8/2015 | Qing | G06F 3/0412 345/173 |
| 2015/0348504 A1 * | 12/2015 | Sakariya | G09G 3/3233 345/206 |
| 2016/0062522 A1 | 3/2016 | Yang | |
| 2016/0179256 A1 | 6/2016 | Yang | |
| 2016/0225313 A1 | 8/2016 | Qing et al. | |
| 2016/0246409 A1 | 8/2016 | Yang | |
| 2016/0246424 A1 | 8/2016 | Yang | |
| 2016/0253014 A1 | 9/2016 | Yang | |
| 2016/0260380 A1 | 9/2016 | Yang | |

FOREIGN PATENT DOCUMENTS

| | | |
|---|---|---|
| CN | 103034365 A | 4/2013 |
| CN | 103135846 A | 6/2013 |
| CN | 103208255 A | 7/2013 |
| CN | 103218972 A | 7/2013 |
| CN | 103235846 A | 8/2013 |
| CN | 103236238 A | 8/2013 |
| CN | 103246396 A | 8/2013 |
| CN | 103310729 A | 9/2013 |
| CN | 103325339 A | 9/2013 |
| CN | 203232681 U | 10/2013 |
| CN | 103413521 A | 11/2013 |
| CN | 103456267 A | 12/2013 |
| CN | 203366702 U | 12/2013 |
| CN | 203503280 U | 3/2014 |
| CN | 103996376 A | 8/2014 |
| CN | 103996377 A | 8/2014 |
| CN | 104021756 A | 9/2014 |
| CN | 104091563 A | 10/2014 |
| CN | 104103239 A | 10/2014 |
| CN | 104252844 A | 12/2014 |
| JP | 2007316462 A | 12/2007 |

OTHER PUBLICATIONS

International Search Report and Written Opinion for Application No. PCT/CN2015/072644, dated Jun. 19, 2015, 12 Pages.
International Search Report and Written Opinion for Application No. PCT/CN2014/090803, dated Mar. 30, 2015, 10 Pages.
First Office Action for Chinese Application No. 201410505051.X, dated Jan. 19, 2016, 5 Pages.
First Office Action for Chinese Application No. 201410283087.8, dated Nov. 13, 2015, 5 Pages.
First Office Action for Chinese Application No. 201410491603.6, dated Dec. 24, 2015, 16 Pages.
Second Office Action for Chinese Application No. 201410505051. X, dated Aug. 22, 2016, 3 Pages.
Second Office Action for Chinese Application No. 201410491603.6, dated Aug. 30, 2016, 4 Pages.
Non-Final Rejection for U.S. Appl. No. 14/654,019, dated Aug. 10, 2016, 13 Pages.
Non-Final Rejection for U.S. Appl. No. 14/769,244, dated Sep. 21, 2016, 11 Pages.

* cited by examiner

US 9,984,272 B2

PIXEL CIRCUIT, ITS DRIVING METHOD, LIGHT-EMITTING DIODE DISPLAY PANEL, AND DISPLAY DEVICE

CROSS-REFERENCE TO RELATED APPLICATION APPLICATIONS

The present application is the U.S. National Phase of PCT Application No. PCT/CN2015/070152 filed on Jan. 6, 2015, which claims a priority of the Chinese patent application No. 201410505051.X filed on Sep. 26, 2014, which is incorporated herein by reference in its entirety.

TECHNICAL FIELD

The present disclosure relates to the field of display technology, in particular to a pixel circuit, its driving method, a light-emitting diode (LED) display panel, and a display device.

BACKGROUND

Active matrix/organic light-emitting diode (AMOLED) display has currently become one of the hotspots in the research field of a flat-panel display. As compared with a liquid crystal display, the OLED has such advantages as low power consumption, low production cost, self luminescence, wide viewing angle and rapid response, so it has replaced the traditional liquid crystal display in display devices such as mobile phones, personal digital assistants (PDAs) and digital cameras. The design of a pixel driver circuit, as a core technology for the AMOLED display, is of very important significance.

Different from a thin film transistor (TFT)-LCD where a stable voltage is used to control the brightness, the OLED is driven by a current, so the stable current is required to control the light emission. Due to limitations of the manufacture process and the aging of elements, a threshold voltage ($V_{th}$) of a driving TFT for each pixel may be drifted, and the current flowing through the OLED of each pixel may be changed along with the threshold voltage. As a result, uneven display brightness will occur, and an image display effect will be adversely affected.

Because a fingerprint of each person is unique, it is able to remarkably improve the system security through a fingerprint identification technique, and this technique will fit well in security protection or high-end consumer electronic products.

Hence, how to integrate a touch in-cell technique and an AMOLED technique with the fingerprint identification technique will certainly be a new trend for the display technology.

SUMMARY

An object of the present disclosure is to provide a pixel circuit, its driving method, an LED display panel, and a display device, so as to improve the brightness evenness of the LED display panel as well as an image display effect of the display device, thereby to achieve the integration of display driving, fingerprint identification and touch detection in an effective manner.

In one aspect, the present disclosure provides in one embodiment a pixel circuit including an LED, a cathode of which is connected to a first signal source. The pixel circuit further includes: a display driving module connected to a first scanning line, a second scanning line, a control line, a data line, a second signal source, a third signal source and an anode of the LED, and configured to, under the control of a first scanning signal from the first scanning line, a second scanning signal from the second scanning line and a control signal from the control line, compensate for a threshold voltage of a driving transistor using a data signal from the data line and a second signal from the second signal source, so that a light-emitting driving signal for the LED is irrelevant to the threshold voltage of the driving transistor; and a fingerprint identification module connected to the first scanning line, the second scanning line, a fourth signal source and a signal read line, and configured to, under the control of the first scanning signal from the first scanning line and the second scanning signal from the second scanning line, identify a fingerprint and detect a touch.

Alternatively, the display driving module includes a first TFT, a second TFT, a third TFT, a fourth TFT, a fifth TFT, a first storage capacitor, and a first driving transistor. A first electrode of the first TFT is connected to the second signal source and a first end of the first storage capacitor, a gate electrode thereof is connected to the control line, and a second electrode thereof is connected to a first electrode of the first driving transistor. A first electrode of the second TFT is connected to the first electrode of the first driving transistor, a gate electrode thereof is connected to the second scanning line, and a second electrode thereof is connected to a second end of the first storage capacitor. A first electrode of the third TFT is connected to the third signal source, a gate electrode thereof is connected to the first scanning line, and a second electrode thereof is connected to the second end of the first storage capacitor. A first electrode of the fourth TFT is connected to the data line, a gate electrode thereof is connected to the second scanning line, and a second electrode thereof is connected to a second electrode of the first driving transistor. A first electrode of the fifth TFT is connected to the second electrode of the first driving transistor, a gate electrode thereof is connected to the control line, and a second electrode thereof is connected to the anode of the LED. A gate electrode of the first driving transistor is connected to the second end of the first storage capacitor.

Alternatively, the display driving module includes a sixth TFT, a seventh TFT, an eighth TFT, a second storage capacitor, a second driving transistor and a third driving transistor. A first electrode of the sixth TFT is connected to the data line, a gate electrode thereof is connected to the second scanning line, and a second electrode thereof is connected to a first electrode of the second driving transistor. A first electrode of the seventh TFT is connected to a second end of the second storage capacitor, a gate electrode thereof is connected to the first scanning line, and a second electrode thereof is connected to the third signal source. A first electrode of the eighth TFT is connected to a second electrode of the third driving transistor, a gate electrode thereof is connected to the control line, and a second electrode thereof is connected to the anode of the LED. A gate electrode and a second electrode of the second driving transistor are connected to the second end of the second storage capacitor. A first electrode of the third driving transistor is connected to a first end of the second storage capacitor and the second signal source, and a gate electrode thereof is connected to the second end of the second storage capacitor.

Alternatively, the fingerprint identification module includes a resetting transistor, an amplifying transistor, a switching transistor, a third storage capacitor and a detection electrode. A first electrode of the resetting transistor is connected to the fourth signal source, a gate electrode thereof is connected to the first scanning line, and a second electrode thereof is connected to a second end of the third storage capacitor. A first electrode of the amplifying transistor is connected to the fourth signal source, a gate electrode thereof is connected to the second end of the third storage capacitor, and a second electrode thereof is connected to a first electrode of the switching transistor. A gate electrode of the switching electrode is connected to the second scanning line, and a second electrode thereof is connected to the signal read line. A first end of the third storage capacitor is connected to the second scanning line. The detection electrode is connected to the second end of the third storage capacitor.

Alternatively, the transistors are P-type transistors, the first electrodes are source electrodes, and the second electrodes are drain electrodes.

Alternatively, a first signal from the first signal source is a low level signal or a zero-potential signal, the second signal from the second signal source is a high level signal, a third signal from the third signal source is a low level signal, and a fourth signal from the fourth signal source is a signal with a fixed potential.

Alternatively, the LED is an organic LED.

In another aspect, the present disclosure provides in one embodiment a method for driving the above-mentioned pixel circuit, including steps of: under the control of a first scanning signal from a first scanning line, a second scanning signal from a second scanning line and a control signal from a control line, compensating for a threshold voltage of a driving transistor using a data signal from a data line and a second signal from a second signal source, so that a light-emitting driving signal for an LED is irrelevant to the threshold voltage of the driving transistor; and under the control of the first scanning signal from the first scanning line and the second scanning signal from the second scanning line, identifying a fingerprint and detecting a touch.

Alternatively, the step of, under the control of the first scanning signal from the first scanning line, the second scanning signal from the second scanning line and the control signal from the control line, compensating for the threshold voltage of the driving transistor using the data signal from the data line and the second signal from the second signal source, so that the light-emitting driving signal for the LED is irrelevant to the threshold voltage of the driving transistor includes: at a first stage of a time period, enabling a third TFT to be in an on state, and enabling a first TFT, a second TFT, a fourth TFT and a fifth TFT to be in an off state, thereby enabling a second end of a first storage capacitor to be at a potential of a third signal from a third signal source; at a second stage of the time period, enabling the second TFT, the fourth TFT and a first driving transistor to be in the on state, and enabling the first TFT, the third TFT and the fifth TFT to be in the off state, thereby charging, by the data signal from the data line, the second end of the first storage capacitor to be at a potential equal to a difference between a potential of the data signal and a threshold voltage of the first driving transistor; and at a third stage of the time period, enabling the first TFT and the fifth TFT to be in the on state, and enabling the second TFT, the third TFT and the fourth TFT to be in the off state, thereby determining the light-emitting driving signal for the LED based on the data signal and the second signal, and driving the LED to emit light using the light-emitting driving signal.

Alternatively, the step of, under the control of the first scanning signal from the first scanning line, the second scanning signal from the second scanning line and the control signal from the control line, compensating for the threshold voltage of the driving transistor using the data signal from the data line and the second signal from the second signal source, so that the light-emitting driving signal for the LED is irrelevant to the threshold voltage of the driving transistor includes: at the first stage of the time period, enabling a seventh TFT to be in the on state, and enabling the sixth TFT and the eighth TFT to be in the off state, thereby enabling a second end of a second storage capacitor to be at the potential of the third signal from the third signal source; at the second stage of the time period, enabling the sixth TFT and a second driving transistor to be in the on state, and enabling the seventh TFT and the eighth TFT to be in the off state, thereby charging, by the data signal from the data line, the second end of the second storage capacitor to be at a potential equal to a difference between the potential of the data signal and a threshold voltage of the second driving transistor; and at the third stage of the time period, enabling the eighth TFT to be in the on state, and enabling the sixth TFT and the seventh TFT to be in the off state, thereby determining the light-emitting driving signal for the LED based on the data signal and the second signal, and driving the LED to emit light using the light-emitting driving signal.

Alternatively, the step of, under the control of the first scanning signal from the first scanning line and the second scanning signal from the second scanning line, identifying the fingerprint and detecting the touch includes: at the first stage of the time period, enabling a resetting transistor to be in the on state, and enabling a switching transistor to be in the off state, thereby enabling a second end of a third storage capacitor to be at a potential of a fourth signal from a fourth signal source; at the second stage of the time period, enabling the resetting transistor to be in the off state, enabling the switching transistor to be in the on state, enabling an amplifying transistor to be in the on or off state based on the potential at the second end of the third storage capacitor, thereby enabling a signal read line to transmit a signal corresponding to the state of the amplifying transistor, and enabling a processor connected to the signal read line to identify the fingerprint based on the signal from the signal read line; and at the third stage of the time period, enabling the resetting transistor, the switching transistor and the amplifying transistor to be in the off state.

Alternatively, at the second stage, the method further includes: determining information about a position for a fingerprint identification operation based on information about the second scanning line and the signal read line.

Alternatively, at the first stage, the first scanning signal is a low level signal, the second scanning signal is a high level signal, the control signal is a high level signal, and the data signal is a low level signal or a high level signal; at the second stage, the first scanning signal is a high level signal, a second scanning signal is a low level signal, the control signal is a high level signal, and the data signal is a high level signal; and at the third stage, the first scanning signal is a high level signal, the second scanning signal is a high level signal, the control signal is a low level signal, and the data signal is a low level signal.

In yet another aspect, the present disclosure provides in one embodiment an LED display panel including the above-mentioned pixel circuit.

In still yet another aspect, the present disclosure provides in one embodiment a display device including the above-mentioned LED display panel.

According to the pixel circuit, its driving method, the LED display panel and the display device in the embodiments of the present disclosure, the display driving module is connected to the first scanning line, the second scanning line, the control line, the data line, the second signal source, the third signal source and the anode of the LED, and configured to, under the control of the first scanning signal from the first scanning line, the second scanning signal from the second scanning line and the control signal from the control line, compensate for the threshold voltage of the driving transistor using the light-emitting driving signal for the LED, so that the light-emitting driving signal for the LED is irrelevant to the threshold voltage of the driving transistor; and the fingerprint identification module is connected to the first scanning line, the second scanning line, the fourth signal source and the signal read line, and configured to, under the control of the first scanning signal from the first scanning line and the second scanning signal from the second scanning line, identify the fingerprint and detect the touch. As a result, it is able to improve the brightness evenness of the LED display panel as well as the image display effect of the display device, thereby to achieve the integration of the display driving, the fingerprint identification and the touch detection in an effective manner.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
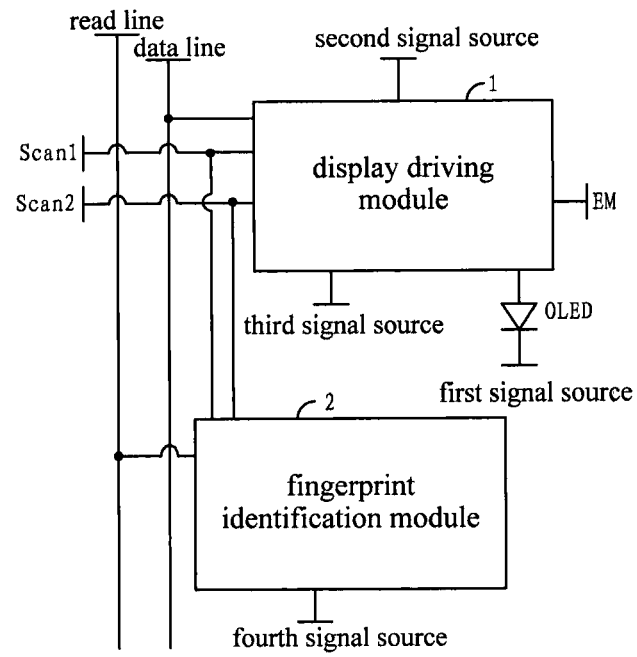
FIG. 1 is a schematic view showing a pixel circuit according to one embodiment of the present disclosure.

The present disclosure provides in one embodiment a pixel circuit which, as shown in FIG. 1, may include an OLED, a cathode of which is connected to a first signal source.

As shown in FIG. 1, the pixel circuit may further include: a display driving module 1 connected to a first scanning line Scan1, a second scanning line Scan2, a control line EM, a data line, a second signal source, a third signal source and an anode of the OLED, and configured to, under the control of a first scanning signal $V_{Scan1}$ from the first scanning line, a second scanning signal $V_{Scan2}$ from the second scanning line and a control signal $V_{EM}$ from the control line, compensate for a threshold voltage $V_{th}$ of a driving transistor using a data signal $V_{data}$ from the data line and a second signal $V_{dd}$ from the second signal source, so that a light-emitting driving signal $I_{OLED}$ for the OLED is irrelevant to the threshold voltage $V_{th}$ of the driving transistor; and a fingerprint identification module 2 connected to the first scanning line, the second scanning line, a fourth signal source and a signal read line, and configured to, under the control of the first scanning signal $V_{Scan1}$ from the first scanning line and the second scanning signal $V_{Scan2}$ from the second scanning line, identify a fingerprint and detect a touch.

In the above embodiment, a first signal from the first signal source may be a low level signal, or the ground may serve as the first signal source so as to input a zero potential. The second signal $V_{dd}$ from the second signal source may be a high level signal, a third signal $V_{int}$ from the third signal source may be a low level signal, and a fourth signal from the fourth signal source may be a signal with a fixed potential, e.g., a common electrode signal Vcom.

The present disclosure further provides in one embodiment a method for driving the above-mentioned pixel circuit, which includes steps of: under the control of the first scanning signal $V_{Scan1}$ from the first scanning line, the second scanning signal $V_{Scan2}$ from a second scanning line and the control signal $V_{EM}$ from the control line, compensating for the threshold voltage $V_{th}$ of the driving transistor using the data signal $V_{data}$ from the data line and the second signal $V_{dd}$ from the second signal source, so that the light-emitting driving signal $I_{OLED}$ for the OLED is irrelevant to the threshold voltage $V_{th}$ of the driving transistor; and under the control of the first scanning signal $V_{Scan1}$ from the first scanning line and the second scanning signal $V_{Scan2}$ from the second scanning line, identifying a fingerprint and detecting a touch.

According to the pixel circuit and its driving method in the embodiments of the present disclosure, it is able to eliminate an effect of the threshold voltage $V_{th}$ of the driving transistor on the light-emitting driving signal $I_{OLED}$, thereby to improve the brightness evenness of the OLED display panel as well as the image display effect of the display device. In addition, through a circuit structure where the control signal is multiplexed, it is able to achieve the display driving and the fingerprint identification simultaneously, thereby to achieve the integration thereof in an effective manner.

Figure 2:
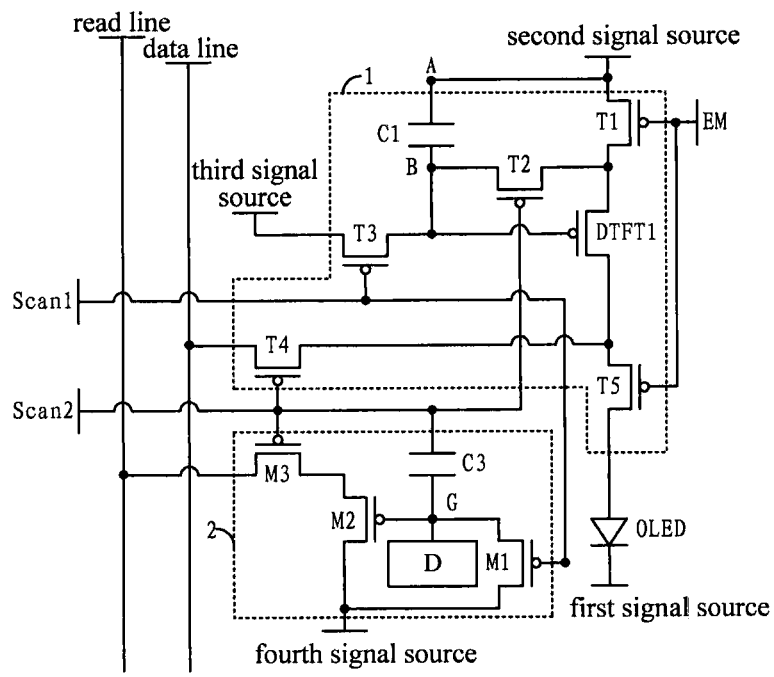
FIG. 2 is a schematic view showing a display driving module of the pixel circuit according to one embodiment of the present disclosure.

In one embodiment, as shown in FIG. 2, the display driving module 1 may include a first TFT T1, a second TFT T2, a third TFT T3, a fourth TFT T4, a fifth TFT T5, a first storage capacitor C1, and a first driving transistor DTFT1. A first electrode of the first TFT T1 is connected to the second signal source and a first end of the first storage capacitor C1, a gate electrode thereof is connected to the control line EM, and a second electrode thereof is connected to a first electrode of the first driving transistor DTFT1. A first electrode of the second TFT T2 is connected to the first electrode of the first driving transistor DTFT1, a gate electrode thereof is connected to the second scanning line, and a second electrode thereof is connected to a second end of the first storage capacitor C1. A first electrode of the third TFT T3 is connected to the third signal source, a gate electrode thereof is connected to the first scanning line, and a second electrode thereof is connected to the second end of the first storage capacitor C1. A first electrode of the fourth TFT T4 is connected to the data line, a gate electrode thereof is connected to the second scanning line, and a second electrode thereof is connected to a second electrode of the first driving transistor DTFT1. A first electrode of the fifth TFT T5 is connected to the second electrode of the first driving transistor DTFT1, a gate electrode thereof is connected to the control line EM, and a second electrode thereof is connected to the anode of the OLED. A gate electrode of the first driving transistor DTFT1 is connected to the second end of the first storage capacitor C1.

The transistors included in the display driving module 1 and the fingerprint identification module 2 may be P-type transistors, so as to manufacture these transistors by an identical process, thereby to improve the yield of the display device. The first electrode of each transistor may be a source electrode, and the second electrode thereof may be a drain electrode.

Figure 3:
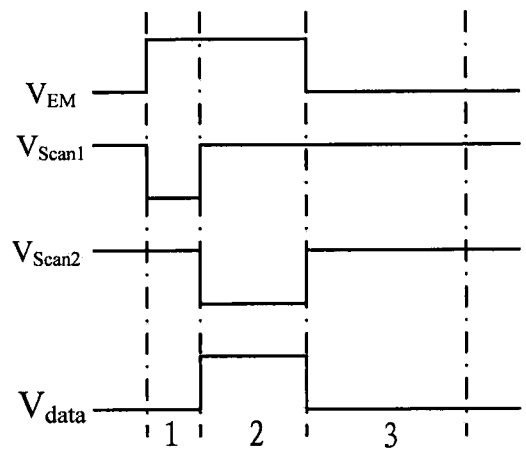
FIG. 3 is a sequence diagram of signals involved in the pixel circuit according to one embodiment of the present disclosure.

The state of the display driving module 1 in FIG. 2 driven by the above method will be described hereinafter in conjunction with the sequence diagram as shown in FIG. 3.

Figure 4:
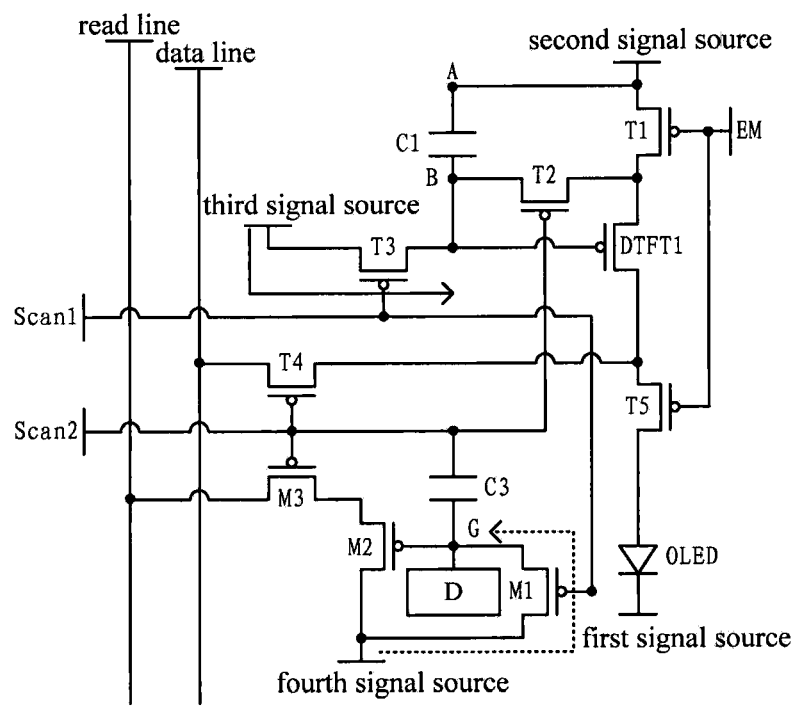
FIG. 4 is a schematic view showing a state of the pixel circuit at a first stage according to one embodiment of the present disclosure.

At a first stage, the display driving module 1 in FIG. 2 may be at a resetting stage. FIG. 3 shows at Stage 1 the signals. To be specific, the control signal $V_{EM}$ may be a high level signal, the first scanning signal $V_{Scan1}$ may be a low level signal, the second scanning signal $V_{Scan2}$ may be a high level signal, and the data signal $V_{data}$ may be a low level signal, so as to enable the third TFT T3 to be in the on state, and enable the first TFT T1, the second TFT T2, the fourth TFT T4 and the fifth TFT T5 to be in the off state. As shown by a solid arrow in FIG. 4, the third signal $V_{int}$ from the third signal source is transmitted to the second end of the first storage capacitor C1, i.e., node B, and the gate electrode of the first driving transistor DTFT1 through the third TFT T3 which is in the on state, so as to enable the second end of the first storage capacitor C1 to be at a potential of the third signal $V_{int}$, i.e., $V_B=V_{int}$. In the embodiments of the present disclosure, the third signal $V_{int}$ may be a low level signal, so the second end of the first storage capacitor C1 is reset.

At a second stage, the display driving module 1 in FIG. 2 may be at a discharging and compensation stage. FIG. 3 shows at stage 2 the signals. To be specific, the control signal $V_{EM}$ may be a high level signal, the first scanning signal $V_{Scan1}$ may be a high level signal, the second scanning signal $V_{Scan2}$ may be a low level signal, and the data signal $V_{data}$ may be a high level signal, so as to enable the second TFT T2 and the fourth TFT T4 to be in the on state, and enable the first TFT T1, the third TFT T3 and the fifth TFT T5 to be in the off state. The gate electrode of the first driving transistor DTFT1 is at the potential of the third signal $V_{int}$ at the first stage, so the first driving transistor DTFT1 is in the on state at the second stage. As shown by a solid arrow in FIG. 5, the data signal $V_{data}$ from the data line is transmitted to the second end of the first storage capacitor C1, i.e., node B, through the fourth TFT T4, the first driving transistor DTFT1 and the second TFT T2 which are in the on state, so as to charge node B to be at a potential equal to a difference between the potential of the data signal $V_{data}$ and the threshold voltage $V_{th1}$ of the first driving transistor DTFT1, i.e., $V_B=V_{data}-V_{th1}$, thereby to enable a voltage difference between the gate electrode and the source electrode of the first driving transistor DTFT1 to be equal to $V_{th1}$. During this procedure, the first end of the first storage capacitor C1, i.e., node A, is always maintained at a potential of the second signal $V_{dd}$, so after the charging, node B is always maintained at a potential equal to $V_{data}-V_{th1}$. In addition, the fifth TFT T5 is in the off state at the second stage, and no current flows through the OLED at this stage. As a result, it is able to prolong a service life of the OLED.

Figure 6:
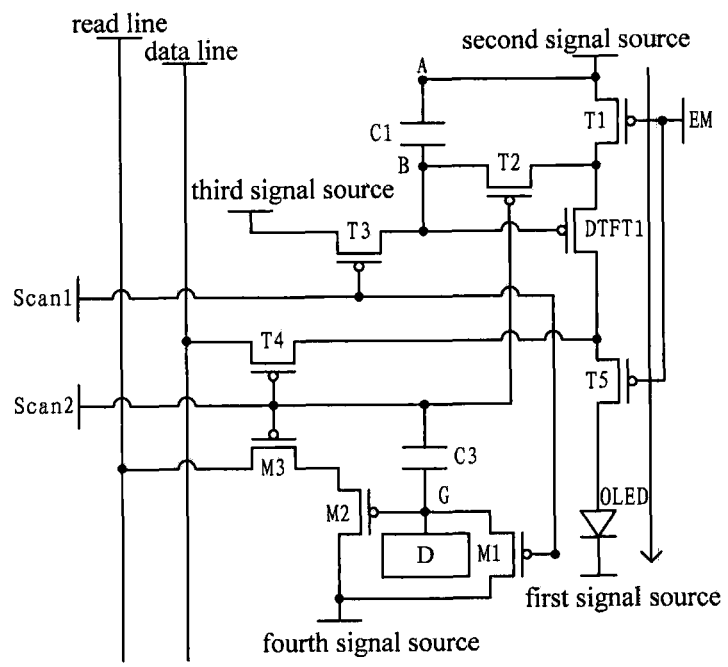
FIG. 6 is a schematic view showing a state of the pixel circuit at a third stage according to one embodiment of the present disclosure.

At a third stage, the display driving module 1 in FIG. 2 may be at a display and light-emitting stage. FIG. 3 shows at Stage 3 the signals. To be specific, the control signal $V_{EM}$ may be a low level signal, the first scanning signal $V_{Scan1}$ may be a high level signal, the second scanning signal $V_{Scan2}$ may be a high level signal, and the data signal $V_{data}$ may be a low level signal, so as to enable the first TFT T1 and the fifth TFT T5 to be in the on state, and enable the second TFT T2, the third TFT T3 and the fourth TFT T4 to be in the off state. As shown by a solid arrow in FIG. 6, the first TFT T1 and the fifth TFT T5 are in the on state, so as to enable the first electrode (i.e., the source electrode) of the first driving transistor DTFT1 to be at a potential of the second signal $V_{dd}$ from the second signal source, thereby to enable the driving current $I_{OLED}$ to flow through the first TFT T1, the first driving transistor DTFT1 and the fifth TFT T5 to drive the OLED to emit light.

Through a saturation current formula for the driving transistor DTFT, the current $I_{OLED}$ may be calculated as follows:

$$I_{OLED} = K(V_{GS} - V_{th1})^2$$
$$= K[V_{dd} - (V_{data} - V_{th1}) - V_{th1}]^2$$
$$= K(V_{dd} - V_{data})^2,$$

where $V_{GS}$ represents a gate-to-source voltage of the first driving transistor, and K is a constant related to a manufacture process and a driver design for the driving transistor DTFT.

As can be seen from the above equation, the operating current $I_{OLED}$ for the OLED is no longer affected by the threshold voltage $V_{th1}$ of the first driving transistor DTFT1, but merely relevant to the second signal $V_{dd}$ and the data signal $V_{data}$. As a result, it is able to thoroughly prevent the threshold voltage $V_{th}$ of the driving transistor DTFT from being drifted due to the manufacture process and a long-term operation, and eliminate an effect of the threshold voltage $V_{th}$ of the driving transistor DTFT on the operating current $I_{OLED}$ of the OLED, thereby to ensure a normal operation of the OLED in each pixel unit and ensure the display evenness.

Figure 7:
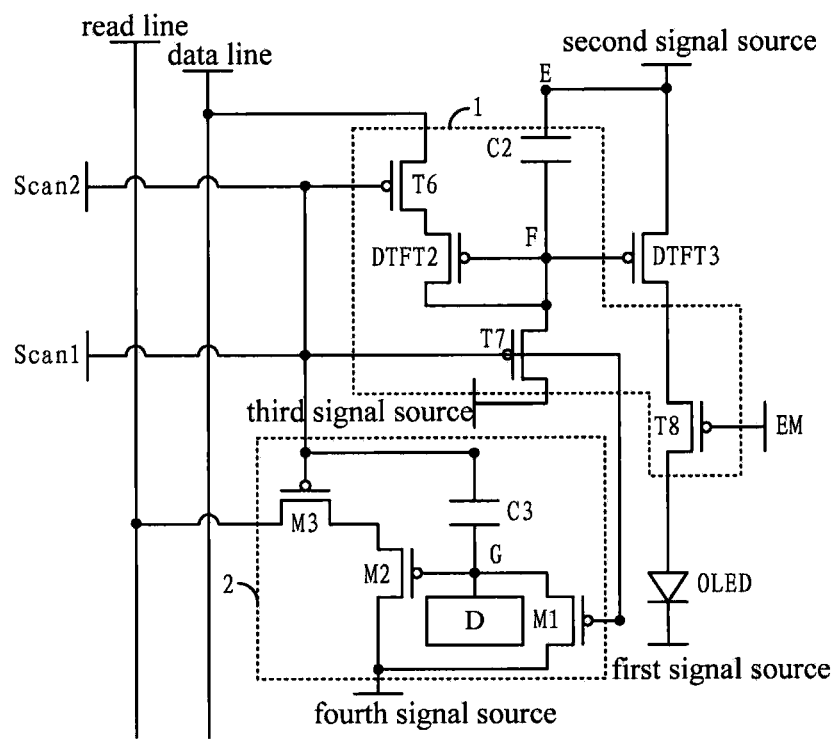
FIG. 7 is another schematic view showing the display driving module of the pixel circuit according to one embodiment of the present disclosure.

In another embodiment, the display driving module 1 may also be implemented in another circuit structure. As shown in FIG. 7, the display driving module 1 may include a sixth TFT T6, a seventh TFT T7, an eighth TFT T8, a second storage capacitor C2, a second driving transistor DTFT2 and a third driving transistor DTFT3. A first electrode of the sixth TFT T6 is connected to the data line, a gate electrode thereof is connected to the second scanning line, and a second electrode thereof is connected to a first electrode of the second driving transistor DTFT2. A first electrode of the seventh TFT T7 is connected to a second end of the second storage capacitor C2, a gate electrode thereof is connected to the first scanning line, and a second electrode thereof is connected to the third signal source. A first electrode of the eighth TFT T8 is connected to a second electrode of the third driving transistor DTFT3, a gate electrode thereof is connected to the control line, and a second electrode thereof is connected to the anode of the OLED. A gate electrode and a second electrode of the second driving transistor DTFT2 are connected to the second end of the second storage capacitor C2. A first electrode of the third driving transistor DTFT3 is connected to a first end of the second storage capacitor C2 and the second signal source, and a gate electrode thereof is connected to the second end of the second storage capacitor C2.

Figure 8:
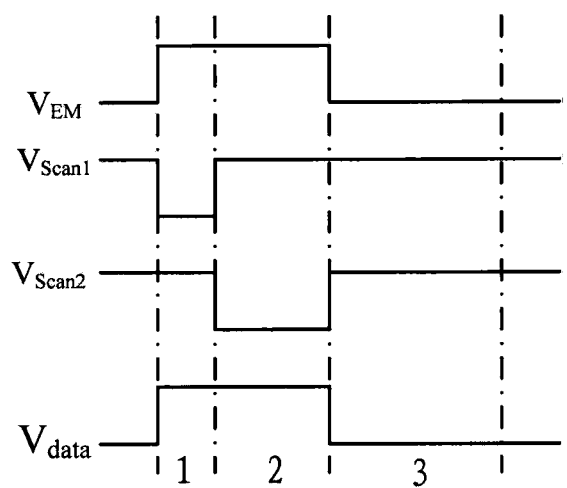
FIG. 8 is another sequence diagram of the signal involved in the pixel circuit according to one embodiment of the present disclosure.

The state of the display driving module 1 in FIG. 7 driven by the above method will be described hereinafter in conjunction with the sequence diagram as shown in FIG. 8.

Figure 9:
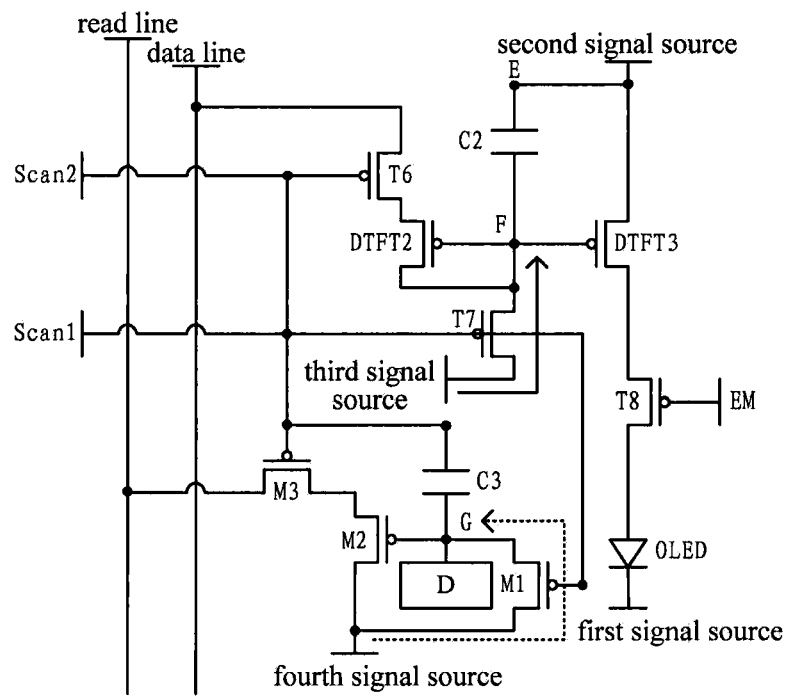
FIG. 9 is another schematic view showing the state of the pixel circuit at the first stage according to one embodiment of the present disclosure.

At a first stage, the display driving module 1 in FIG. 7 may be at a resetting stage. FIG. 8 shows at Stage 1 the signals. To be specific, the control signal $V_{EM}$ may be a high level signal, the first scanning signal $V_{Scan1}$ may be a low level signal, the second scanning signal $V_{Scan2}$ may be a high level signal, and the data signal $V_{data}$ may be a high level signal, so as to enable the seventh TFT T7 to be in the on state, and enable the sixth TFT T6 and the eighth TFT T8 to be in the off state. As shown by a solid arrow in FIG. 9, the third signal $V_{int}$ from the third signal source is transmitted to the second end of the second storage capacitor C2, i.e., node F, and the gate electrodes of the second driving transistor DTFT2 and the third driving transistor DTFT3 through the seventh TFT T7 which is in the on state, so as to enable the second end of the second storage capacitor C2 to be at a potential of the third signal $V_{int}$, i.e., $V_F=V_{int}$. In the embodiments of the present disclosure, the third signal $V_{int}$ may be a low level signal, so the second end of the second storage capacitor C2 is reset.

At a second stage, the display driving module 1 in FIG. 7 may be at a discharging and compensation stage. FIG. 8 shows at stage 2 the signals. To be specific, the control signal $V_{EM}$ may be a high level signal, the first scanning signal $V_{Scan1}$ may be a high level signal, the second scanning signal $V_{Scan2}$ may be a low level signal, and the data signal $V_{data}$ may be a high level signal, so as to enable the sixth TFT T6 to be in the on state and enable the seventh TFT T7 and the eighth TFT T8 to be in the off state. The gate electrodes of the second driving transistor DTFT2 and the third driving transistor DTFT3 are at the potential of the third signal $V_{int}$ at the first stage, so the second driving transistor DTFT2 and the third driving transistor DTFT3 are both in the on state at the second stage. As shown by a solid arrow in FIG. 10, the data signal $V_{data}$ from the data line is transmitted to the second end of the second storage capacitor C2, i.e., node F, through the sixth TFT T6 and the second driving transistor DTFT2 which are in the on state, so as to charge node F to be at a potential equal to a difference between the potential of the data signal $V_{data}$ and the threshold voltage $V_{th2}$ of the second driving transistor DTFT2, i.e., $V_F=V_{data}-V_{th2}$. During this procedure, the first end of the second storage capacitor C2, i.e., node E, is always maintained at a potential of the second signal $V_{dd}$, so after the charging, node F is always maintained As can be seen from the above equation, the operating current $I_{OLED}$ for the OLED is no longer affected by the threshold voltage $V_{th}$ of the driving transistor, but merely relevant to the second signal $V_{dd}$ and the data signal $V_{data}$. As a result, it is able to thoroughly prevent the threshold voltage $V_{th}$ of the driving transistor DTFT from being drifted due to the manufacture process and a long-term operation, and eliminate an effect of the threshold voltage $V_{th}$ of the driving transistor DTFT on the operating current $I_{OLED}$ of the OLED, thereby to ensure a normal operation of the OLED in each pixel unit and ensure the display evenness.

The fingerprint identification module 2 is configured to, when a finger touches a touch panel, determine concave-convex information about the finger by collecting signals through a processor connected to the signal read line based on a coupling capacitance between concave-convex stripes of the finger and a detection electrode, thereby to obtain fingerprint data of the finger.

In one embodiment, as shown in FIG. 2 or 7, the fingerprint identification module 2 may include a resetting transistor M1, an amplifying transistor M2, a switching transistor M3, a third storage capacitor C3 and a detection electrode D. A first electrode of the resetting transistor M1 is connected to the fourth signal source, a gate electrode thereof is connected to the first scanning line, and a second electrode thereof is connected to a second end of the third storage capacitor C3. A first electrode of the amplifying transistor M2 is connected to the fourth signal source, a gate electrode thereof is connected to the second end of the third storage capacitor C3, and a second electrode thereof is connected to a first electrode of the switching transistor M3. A gate electrode of the switching electrode M3 is connected to the second scanning line, and a second electrode thereof is connected to the signal read line. A first end of the third storage capacitor C3 is connected to the second scanning line. The detection electrode D is connected to the second end of the third storage capacitor C3.

The state of the fingerprint identification module 2 in FIG. 2 or 7 driven by the above method will be described hereinafter in conjunction with the sequence diagram as shown in FIG. 3 or 8.

In the embodiments of the present disclosure, an operating procedure of the fingerprint identification module 2 may be identical to that of the display driving module 1, i.e., it may also include three stages.

At a first stage, the fingerprint identification module 2 in FIG. 2 or 7 may be at a resetting stage. FIG. 3 or 8 shows at Stage 1 the signals. To be specific, the first scanning signal $V_{Scan1}$ may be a low level signal, and the second scanning signal $V_{Scan2}$ may be a high level signal, so as to enable the resetting transistor M1 to be in the on state and enable the switching transistor M3 to be in the off state. As shown by a dashed arrow in FIG. 4 or 9, the fourth signal from the fourth signal source, e.g., $V_{an}$, is transmitted to the second end of the third storage capacitor C3, i.e., node G (a connection point where the second end of the third storage capacitor C3, the gate electrode of the amplifying transistor M2 and the detection electrode D are connected to each other), through the resetting transistor M1 which is in the on state, so as to enable node G to be at a potential of the fourth signal $V_{com}$, i.e., $V_G = V_{com}$, thereby to reset node G to be ready for a subsequent signal collection stage. In the embodiments of the present disclosure, the fourth signal $V_{com}$ may be a signal with a fixed potential, so the amplifying transistor M2 is in the off state.

At a second stage, the fingerprint identification module 2 may be at the signal collection stage. FIG. 3 or 8 shows at Stage 2 the signals. To be specific, the first scanning signal $V_{Scan1}$ may be a high level signal, and the second scanning signal $V_{Scan2}$ may be a low level signal, so as to enable the switching transistor M3 to be in the on state and enable the resetting transistor M1 to be in the off state.

Figure 12:
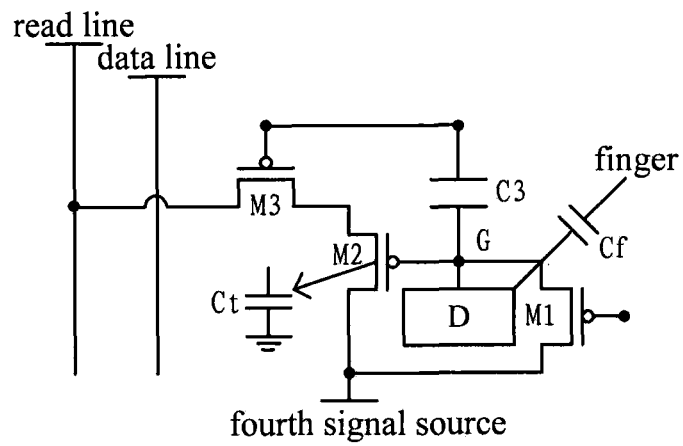
FIG. 12 is a schematic view showing the principle for fingerprint identification of the pixel circuit according to one embodiment of the present disclosure.

As shown in FIG. 12, at the second stage, when a finger touches a touch panel, the fingerprint identification module 2 includes, apart from a reference capacitance C3, a detection capacitance Cf generated between the finger and the detection electrode D. Meanwhile, a parasitic capacitance Ct is also generated by the amplifying transistor M2 itself. A potential at the gate electrode of the amplifying transistor M2 may be changed along with the detection capacitance Cf (the potential at the gate electrode depends on Cf, C3 and Ct, i.e., the more the Cf is, the smaller the potential at the gate electrode is, and vice verse), so as to change the current flowing out of the drain electrode of the amplifying transistor M2. Hence, it is able for the processor to determine the concave-convex information about a surface of the finger based on the current change, thereby to identify the finger.

Figure 13:
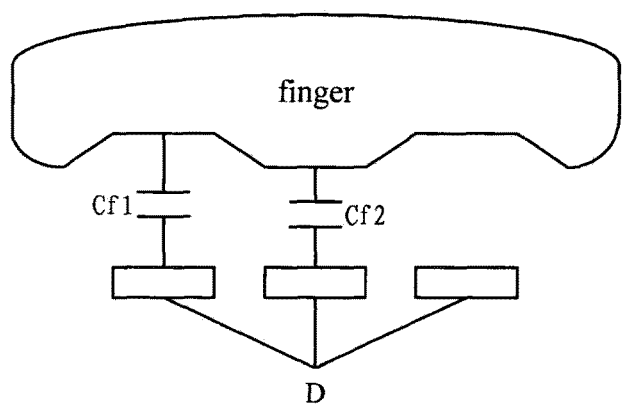
FIG. 13 is another schematic view showing the principle for fingerprint identification of the pixel circuit according to one embodiment of the present disclosure.

As shown in FIG. 13, when a concave part of the finger is located above the detection electrode D, a coupling capacitance Cf1 may be generated between the concave part and the detection electrode D. There is a relatively large distance between the concave part and the detection electrode D, so this coupling capacitance Cf1 is sufficiently small relative to C3 and Ct, and the potential at the gate electrode of the amplifying transistor M2 may be decreased slightly, i.e., the potential at the gate electrode of the amplifying transistor M2 is relatively high so as to enable the amplifying transistor M2 to be in the off state. At this time, no signal flows out of the drain electrode of the amplifying transistor M2, i.e., no signal flows through the switching transistor M3 which is in the on state to the signal read line, and an initial signal is still transmitted in the signal read line. Then, the processor determines, based on a result obtained in accordance with the initial signal, that a part of the finger which is in contact with the detection electrode D (i.e., the pane), is the concave part.

Figure 5:
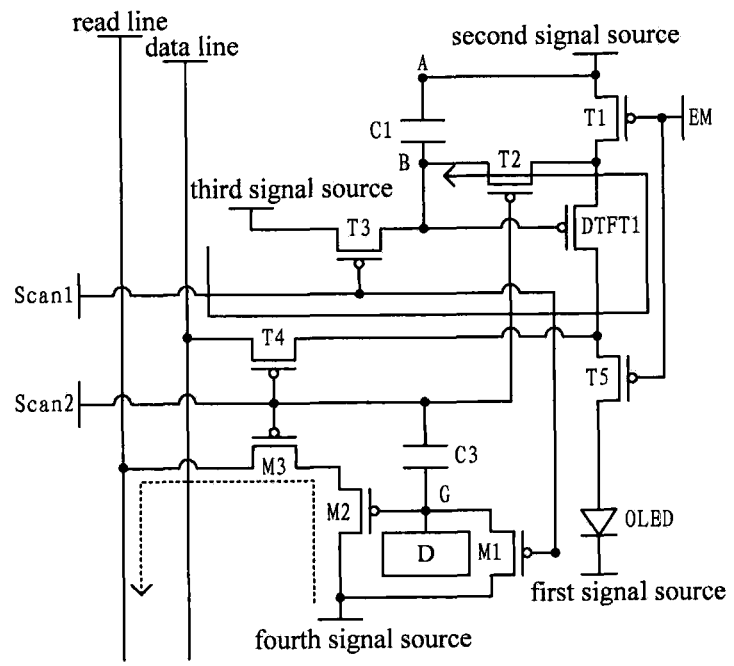
FIG. 5 is a schematic view showing a state of the pixel circuit at a second stage according to one embodiment of the present disclosure.
Figure 10:
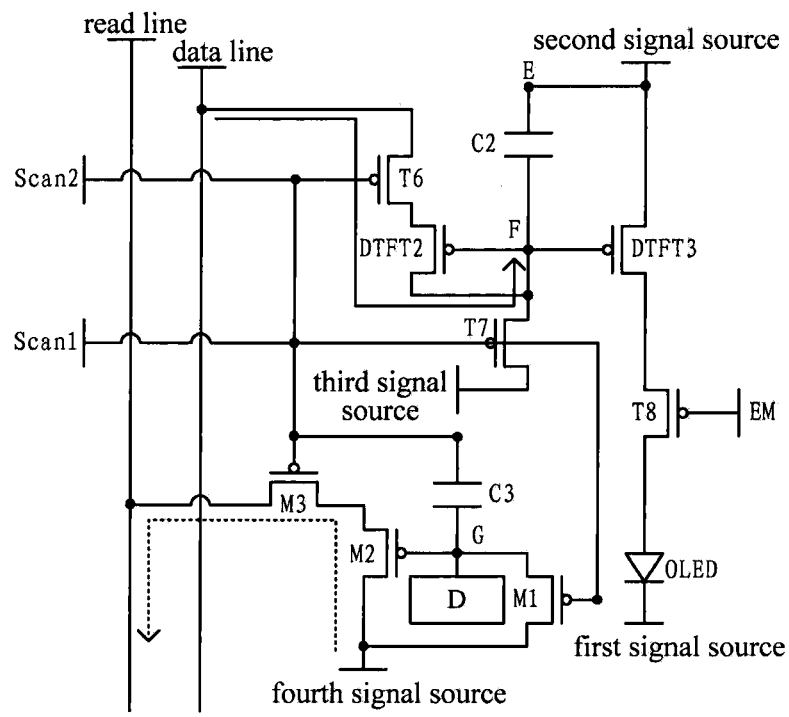
FIG. 10 is another schematic view showing the state of the pixel circuit at the second state according to one embodiment of the present disclosure.
Figure 11:
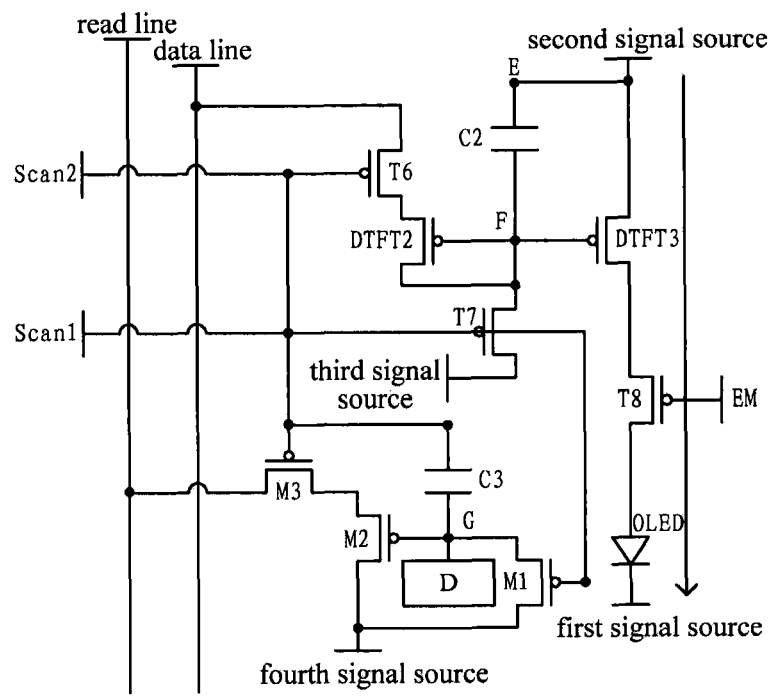
FIG. 11 is another schematic view showing the state of the pixel circuit at the third stage according to one embodiment of the present disclosure.

As also shown in FIG. 13, when a convex part of the finger is located above the detection electrode D, a coupling capacitance CC may be generated between the convex part and the detection electrode D. There is a relatively small distance between the concave part and the detection electrode D, so this coupling capacitance Cf1 is sufficiently large relative to C3 and Ct, and the potential at the gate electrode of the amplifying transistor M2 may be decreased remarkably, i.e., the potential at the gate electrode of the amplifying transistor M2 is relatively low so as to enable the amplifying transistor M2 to be in the on state. At this time, as shown in FIG. 5 or 10, the fourth signal from the fourth signal source is transmitted to the signal read line through the amplifying transistor M2 (which is configured to amplify the fourth signal transmitted through the amplifying transistor M2) and the switching transistor M3 which are in the on state, and the signal real line reads the current signal amplified by the amplifying transistor M2. Then, the processor determines, based on a result obtained in accordance with the amplified current signal, that a part of the finger that touches the detection electrode D (i.e., the panel) is the convex part.

After the processor has collected the complete concave-convex information about the finger, it is able to identify the finger.

In one embodiment, at the second stage, an X-axis coordinate of a touch point may be determined in accordance with a signal output point of the second scanning signal, and a Y-axis coordinate of the touch point may be determined in accordance with information about the signal read line for transmitting the current signal. In this way, it is able to determine the coordinates of the touch point.

In other words, in the embodiments of the present disclosure, the fingerprint identification module 2 may also serve as a capacitive touch detection module which is configured to detect positional information about the touch point when the finger touches the panel.

Hence, in one embodiment, the method may further include determining positional information for a finger identification operation based on information about the second scanning line and the signal read line.

At a third stage, the fingerprint identification module 2 in FIG. 2 or 7 may be at a stagnation stage. FIG. 3 or 8 shows at Stage 3 the signals. To be specific, the first scanning signal $V_{Scan1}$ may be a high level signal, and the second scanning signal $V_{Scan2}$ may be a high level signal, so as to enable the resetting transistor M1 and the switching transistor M3 to be in the off state. In other words, all elements in the fingerprint identification module 2 do not work at the third stage, while the display driving module 1 is at the light-emitting stage. As a result, it is able to reduce the effect of the fingerprint identification on the display driving, thereby to achieve the integration of the fingerprint identification and the display driving in an effective manner.

The fingerprint identification module 2 may also serve as a capacitive touch detection module, so through the circuit structure where the signals are multiplexed, it is able for the pixel circuit in the embodiments of the present disclosure to perform the pixel compensation, the fingerprint identification and the capacitive touch detection simultaneously, thereby to perform the operation in a convenient and effective manner. This structure design overturns a traditional mode where the functions of all the elements are combined in a simply accumulative manner, so it is able to provide a value-added display product.

Figure 14:
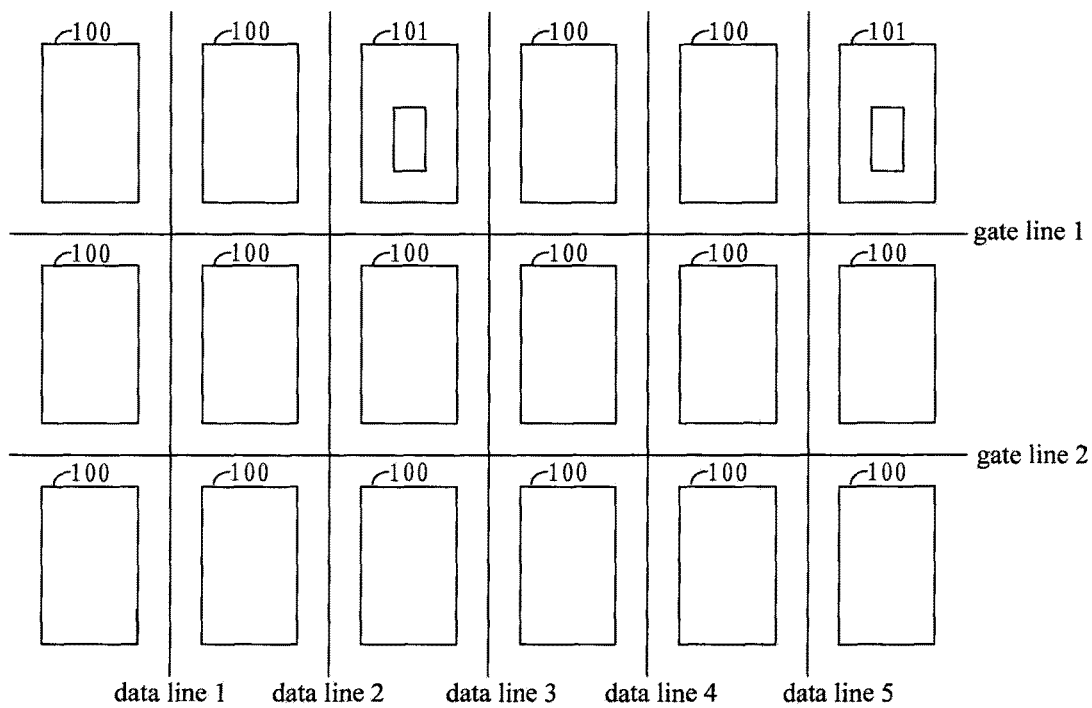
FIG. 14 is a schematic view showing the distribution of the pixel circuits according to one embodiment of the present disclosure.

In the embodiments of the present disclosure, when designing the pixel units, the fingerprint identification modules 2 may, based on the requirements on the resolution for touch, be arranged within a specified pixel unit in a predetermined manner. For example, the touch detection modules 2 may be arranged in a 3*3 mode as shown in FIG. 14, i.e., in 3*3 pixel units, the display driving module 1 and the fingerprint identification module 2 are merely arranged in one pixel unit 101, and merely the display driving module 1 is arranged in the other pixel units 100, so as to simplify the structure of the pixel units, thereby to reduce the production cost of the display panel.

The present disclosure further provides in one embodiment an OLED display panel including the above-mentioned pixel circuit.

The present disclosure further provides in one embodiment a display device including the above-mentioned OLED display panel. The display device may be a liquid crystal panel, a liquid crystal TV, a liquid crystal display, an OLED panel, an OLED display, a plasma display or an electronic paper.

The pixel circuit, the OLED display panel and the display panel in the embodiments of the present disclosure are particularly suitable for a gate-on-array (GOA) circuit manufactured by a low temperature poly-silicon (LTPS) process or an a-Si process.

According to the embodiments of the present disclosure, the pixel circuit may include: the display driving module connected to the first scanning line, the second scanning line, the control line, the data line, the second signal source, a third signal source and the anode of the OLED, and configured to, under the control of the first scanning signal from the first scanning line, the second scanning signal from the second scanning line and the control signal from the control line, compensate for the threshold voltage of the driving transistor using the data signal from the data line and the second signal from the second signal source, so that the light-emitting driving signal for the LED is irrelevant to the threshold voltage of the driving transistor; and the fingerprint identification module connected to the first scanning line, the second scanning line, the fourth signal source and the signal read line, and configured to, under the control of the first scanning signal from the first scanning line and the second scanning signal from the second scanning line, identify the fingerprint and detect the touch.

According to the embodiments of the present disclosure, the driving signal for the OLED is irrelevant to the threshold voltage $V_{th}$ of the driving transistor DTFT, so it is able to eliminate an effect of the threshold voltage $V_{th}$ of the driving transistor DTFT on the light-emitting driving signal, thereby to improve the brightness evenness of the OLED display panel and improve the display effect of the display device.

In addition, a fingerprint identification circuit and a touch signal detection circuit for an in-cell touch panel may be integrated into the pixel unit, so it is able to achieve the fingerprint identification and the touch detection while performing the display driving, thereby to achieve the integration of the pixel driving circuit and the fingerprint identification circuit (which has a touch detection function). In this way, the in-cell touch panel and OLED display are integrated, it is able to reduce a thickness and a weight of the display panel, thereby to reduce the production cost thereof.

Moreover, according to the embodiments of the present disclosure, it is able to prevent the current from flowing through the OLED for a long period of time, thereby to prolong a service life of the OLED.

In addition, according to the embodiments of the present disclosure, when the OLED is driven by the display driving module to emit light, the fingerprint identification module is in the stagnation state, so it is able to reduce the effect of the fingerprint identification on the display driving, thereby to achieve the integration of the display driving and the fingerprint identification in an effective manner.

It should be appreciated that, the pixel circuit in the embodiments of the present disclosure may include a-Si, poly-Si or oxide TFTs, and these TFTs may be replaced with N-type TFTs or complementary metal oxide semiconductor (CMOS) transistors. In addition, although the description is given hereinbefore by taking the display device including the AMOLED as an example, the display device may also include the other LEDs.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A pixel circuit, comprising a light-emitting diode (LED), a cathode of which is connected to a first signal source, wherein the pixel circuit further comprises:
    a display driving circuit directly connected to a first scanning line, a second scanning line, a control line, a data line, a second signal source, a third signal source, and an anode of the LED, and configured to, under the control of a first scanning signal from the first scanning line, a second scanning signal from the second scanning line, and a control signal from the control line, compensate for a threshold voltage of a driving transistor using a data signal from the data line and a second signal from the second signal source, so that a light-emitting driving signal for the LED is irrelevant to the threshold voltage of the driving transistor; and
    a fingerprint identification circuit directly connected to the first scanning line, the second scanning line, a fourth signal source, and a signal read line, and configured to, under the control of the first scanning signal from the first scanning line and the second scanning signal from the second scanning line, identify a fingerprint and detect a touch;
    wherein the fingerprint identification circuit comprises a resetting transistor, an amplifying transistor, a switching transistor, a third storage capacitor, and a detection electrode;
    a first electrode of the resetting transistor is directly connected to the fourth signal source, a gate electrode thereof is directly connected to the first scanning line, and a second electrode thereof is directly connected to a second end of the third storage capacitor;
    a first electrode of the amplifying transistor is directly connected to the fourth signal source, a gate electrode thereof is directly connected to the second end of the third storage capacitor, and a second electrode thereof is directly connected to a first electrode of the switching transistor;
    a gate electrode of the switching electrode is directly connected to the second scanning line, and a second electrode thereof is directly connected to the signal read line;
    a first end of the third storage capacitor is directly connected to the second scanning line; and
    the detection electrode is directly connected to the second end of the third storage capacitor.

2. The pixel circuit according to claim 1, wherein the display driving circuit comprises a first thin film transistor (TFT), a second TFT, a third TFT, a fourth TFT, a fifth TFT, a first storage capacitor, and a first driving transistor;
    a first electrode of the first TFT is directly connected to the second signal source and a first end of the first storage capacitor, a gate electrode thereof is directly connected to the control line, and a second electrode thereof is directly connected to a first electrode of the first driving transistor;

a first electrode of the second TFT is directly connected to the first electrode of the first driving transistor, a gate electrode thereof is directly connected to the second scanning line, and a second electrode thereof is directly connected to a second end of the first storage capacitor;

a first electrode of the third TFT is directly connected to the third signal source, a gate electrode thereof is directly connected to the first scanning line, and a second electrode thereof is directly connected to the second end of the first storage capacitor;

a first electrode of the fourth TFT is directly connected to the data line, a gate electrode thereof is directly connected to the second scanning line, and a second electrode thereof is directly connected to a second electrode of the first driving transistor;

a first electrode of the fifth TFT is directly connected to the second electrode of the first driving transistor, a gate electrode thereof is directly connected to the control line, and a second electrode thereof is directly connected to the anode of the LED; and a gate electrode of the first driving transistor is directly connected to the second end of the first storage capacitor.

3. The pixel circuit according to claim 2, wherein the display driving circuit further comprises a sixth TFT, a seventh TFT, an eighth TFT, a second storage capacitor, a second driving transistor, and a third driving transistor;

a first electrode of the sixth TFT is directly connected to the data line, a gate electrode thereof is directly connected to the second scanning line, and a second electrode thereof is directly connected to a first electrode of the second driving transistor;

a first electrode of the seventh TFT is directly connected to a second end of the second storage capacitor, a gate electrode thereof is directly connected to the first scanning line, and a second electrode thereof is directly connected to the third signal source;

a first electrode of the eighth TFT is directly connected to a second electrode of the third driving transistor, a gate electrode thereof is directly connected to the control line, and a second electrode thereof is directly connected to the anode of the LED;

a gate electrode and a second electrode of the second driving transistor are directly connected to the second end of the second storage capacitor; and a first electrode of the third driving transistor is directly connected to a first end of the second storage capacitor and the second signal source, and a gate electrode thereof is directly connected to the second end of the second storage capacitor.

4. The pixel circuit according to claim 3, wherein a first signal from the first signal source is a low level signal or a zero-potential signal, the second signal from the second signal source is a high level signal, a third signal from the third signal source is a low level signal, and a fourth signal from the fourth signal source is a signal with a fixed potential.

5. The pixel circuit according to claim 2, wherein the transistors are P-type transistors, the first electrodes are source electrodes, and the second electrodes are drain electrodes.

6. The pixel circuit according to claim 2, wherein a first signal from the first signal source is a low level signal or a zero-potential signal, the second signal from the second signal source is a high level signal, a third signal from the third signal source is a low level signal, and a fourth signal from the fourth signal source is a signal with a fixed potential.

7. The pixel circuit according to claim 1, wherein a first signal from the first signal source is a low level signal or a zero-potential signal, the second signal from the second signal source is a high level signal, a third signal from the third signal source is a low level signal, and a fourth signal from the fourth signal source is a signal with a fixed potential.

8. The pixel circuit according to claim 1, wherein the LED is an organic light-emitting diode (OLED).

9. A method for driving the pixel circuit according to claim 1, comprising steps of:

under the control of a first scanning signal from a first scanning line, a second scanning signal from a second scanning line and a control signal from a control line, compensating for a threshold voltage of a driving transistor using a data signal from a data line and a second signal from a second signal source, so that a light-emitting driving signal for a light-emitting diode (LED) is irrelevant to the threshold voltage of the driving transistor; and under the control of the first scanning signal from the first scanning line and the second scanning signal from the second scanning line, identifying a fingerprint and detecting a touch;

wherein the step of, under the control of the first scanning signal from the first scanning line and the second scanning signal from the second scanning line, identifying the fingerprint and detecting the touch comprises:

at the first stage of the time period, enabling a resetting transistor to be in the on state, and enabling a switching transistor to be in the off state, thereby enabling a second end of a third storage capacitor to be at a potential of a fourth signal from a fourth signal source;

at the second stage of the time period, enabling the resetting transistor to be in the off state, enabling the switching transistor to be in the on state, enabling an amplifying transistor to be in the on or off state based on the potential at the second end of the third storage capacitor, thereby enabling a signal read line to transmit a signal corresponding to the state of the amplifying transistor, and enabling a processor connected to the signal read line to identify the fingerprint based on the signal from the signal read line; and at the third stage of the time period, enabling the resetting transistor, the switching transistor and the amplifying transistor to be in the off state.

10. The method according to claim 9, wherein the step of, under the control of the first scanning signal from the first scanning line, the second scanning signal from the second scanning line and the control signal from the control line, compensating for the threshold voltage of the driving transistor using the data signal from the data line and the second signal from the second signal source, so that the light-emitting driving signal for the LED is irrelevant to the threshold voltage of the driving transistor comprises:

at a first stage of a time period, enabling a third TFT to be in an on state, and enabling a first thin film transistor (TFT), a second TFT, a fourth TFT and a fifth TFT to be in an off state, thereby enabling a second end of a first storage capacitor to be at a potential of a third signal from a third signal source;

at a second stage of the time period, enabling the second TFT, the fourth TFT and a first driving transistor to be in the on state, and enabling the first TFT, the third TFT and the fifth TFT to be in the off state, thereby charging, by the data signal from the data line, the second end of the first storage capacitor to be at a potential equal to a difference between a potential of the data signal and a threshold voltage of the first driving transistor; and at a third stage of the time period, enabling the first TFT and the fifth TFT to be in the on state, and enabling the second TFT, the third TFT and the fourth TFT to be in the off state, thereby determining the light-emitting driving signal for the LED based on the data signal and the second signal, and driving the LED to emit light using the light-emitting driving signal.

11. The method according to claim 10, wherein the step of, under the control of the first scanning signal from the first scanning line, the second scanning signal from the second scanning line and the control signal from the control line, compensating for the threshold voltage of the driving transistor using the data signal from the data line and the second signal from the second signal source, so that the light-emitting driving signal for the LED is irrelevant to the threshold voltage of the driving transistor comprises:

at the first stage of the time period, enabling a seventh TFT to be in the on state, and enabling the sixth TFT and the eighth TFT to be in the off state, thereby enabling a second end of a second storage capacitor to be at the potential of the third signal from the third signal source;

at the second stage of the time period, enabling the sixth TFT and a second driving transistor to be in the on state, and enabling the seventh TFT and the eighth TFT to be in the off state, thereby charging, by the data signal from the data line, the second end of the second storage capacitor to be at a potential equal to a difference between the potential of the data signal and a threshold voltage of the second driving transistor; and at the third stage of the time period, enabling the eighth TFT to be in the on state, and enabling the sixth TFT and the seventh TFT to be in the off state, thereby determining the light-emitting driving signal for the LED based on the data signal and the second signal, and driving the LED to emit light using the light-emitting driving signal.

12. The method according to claim 11, wherein at the first stage, the first scanning signal is a low level signal, the second scanning signal is a high level signal, the control signal is a high level signal, and the data signal is a low level signal or a high level signal;

at the second stage, the first scanning signal is a high level signal, a second scanning signal is a low level signal, the control signal is a high level signal, and the data signal is a high level signal; and at the third stage, the first scanning signal is a high level signal, the second scanning signal is a high level signal, the control signal is a low level signal, and the data signal is a low level signal.

13. The method according to claim 10, wherein at the first stage, the first scanning signal is a low level signal, the second scanning signal is a high level signal, the control signal is a high level signal, and the data signal is a low level signal or a high level signal;

at the second stage, the first scanning signal is a high level signal, a second scanning signal is a low level signal, the control signal is a high level signal, and the data signal is a high level signal; and at the third stage, the first scanning signal is a high level signal, the second scanning signal is a high level signal, the control signal is a low level signal, and the data signal is a low level signal.

14. The method according to claim 9, further comprising, at the second stage, a step of:

determining information about a position for a fingerprint identification operation based on information about the second scanning line and the signal read line.

15. The method according to claim 9, wherein at the first stage, the first scanning signal is a low level signal, the second scanning signal is a high level signal, the control signal is a high level signal, and the data signal is a low level signal or a high level signal;

at the second stage, the first scanning signal is a high level signal, a second scanning signal is a low level signal, the control signal is a high level signal, and the data signal is a high level signal; and at the third stage, the first scanning signal is a high level signal, the second scanning signal is a high level signal, the control signal is a low level signal, and the data signal is a low level signal.

16. A light-emitting diode (LED) display panel, comprising the pixel circuit according to claim 1.

17. A display device, comprising the LED display panel according to claim 16.

18. A pixel circuit, comprising a light-emitting diode (LED), a cathode of which is connected to a first signal source, wherein the pixel circuit further comprises:

a display driving circuit directly connected to a first scanning line, a second scanning line, a control line, a data line, a second signal source, a third signal source, and an anode of the LED, and configured to, under the control of a first scanning signal from the first scanning line, a second scanning signal from the second scanning line, and a control signal from the control line, compensate for a threshold voltage of a driving transistor using a data signal from the data line and a second signal from the second signal source, so that a light-emitting driving signal for the LED is irrelevant to the threshold voltage of the driving transistor; and a fingerprint identification circuit directly connected to the first scanning line, the second scanning line, a fourth signal source, and a signal read line, and configured to, under the control of the first scanning signal from the first scanning line and the second scanning signal from the second scanning line, identify a fingerprint and detect a touch, wherein the display driving circuit comprises a first thin film transistor (TFT), a second TFT, a third TFT, a fourth TFT, a fifth TFT, a first storage capacitor, and a first driving transistor;

a first electrode of the first TFT is directly connected to the second signal source and a first end of the first storage capacitor, a gate electrode thereof is directly connected to the control line, and a second electrode thereof is directly connected to a first electrode of the first driving transistor;

a first electrode of the second TFT is directly connected to the first electrode of the first driving transistor, a gate electrode thereof is directly connected to the second scanning line, and a second electrode thereof is directly connected to a second end of the first storage capacitor;

a first electrode of the third TFT is directly connected to the third signal source, a gate electrode thereof is directly connected to the first scanning line, and a second electrode thereof is directly connected to the second end of the first storage capacitor;

a first electrode of the fourth TFT is directly connected to the data line, a gate electrode thereof is directly connected to the second scanning line, and a second electrode thereof is directly connected to a second electrode of the first driving transistor;

a first electrode of the fifth TFT is directly connected to the second electrode of the first driving transistor, a gate electrode thereof is directly connected to the control line, and a second electrode thereof is directly connected to the anode of the LED; and a gate electrode of the first driving transistor is directly connected to the second end of the first storage capacitor.

19. A method for driving a pixel circuit, the pixel circuit including a light-emitting diode (LED), a cathode of which is connected to a first signal source, a display driving circuit, and a fingerprint identification circuit, the display driving circuit directly connected to a first scanning line, a second scanning line, a control line, a data line, a second signal source, a third signal source, and an anode of the LED, and configured to, under the control of a first scanning signal from the first scanning line, a second scanning signal from the second scanning line, and a control signal from the control line, compensate for a threshold voltage of a driving transistor using a data signal from the data line and a second signal from the second signal source, so that a light-emitting driving signal for the LED is irrelevant to the threshold voltage of the driving transistor, and the fingerprint identification circuit directly connected to the first scanning line, the second scanning line, a fourth signal source, and a signal read line, and configured to, under the control of the first scanning signal from the first scanning line and the second scanning signal from the second scanning line, identify a fingerprint and detect a touch, the method comprising steps of:

under the control of a first scanning signal from a first scanning line, a second scanning signal from a second scanning line and a control signal from a control line, compensating for a threshold voltage of a driving transistor using a data signal from a data line and a second signal from a second signal source, so that a light-emitting driving signal for a light-emitting diode (LED) is irrelevant to the threshold voltage of the driving transistor; and under the control of the first scanning signal from the first scanning line and the second scanning signal from the second scanning line, identifying a fingerprint and detecting a touch, wherein the step of, under the control of the first scanning signal from the first scanning line, the second scanning signal from the second scanning line and the control signal from the control line, compensating for the threshold voltage of the driving transistor using the data signal from the data line and the second signal from the second signal source, so that the light-emitting driving signal for the LED is irrelevant to the threshold voltage of the driving transistor comprises:

at a first stage of a time period, enabling a third TFT to be in an on state, and enabling a first thin film transistor (TFT), a second TFT, a fourth TFT and a fifth TFT to be in an off state, thereby enabling a second end of a first storage capacitor to be at a potential of a third signal from a third signal source;

at a second stage of the time period, enabling the second TFT, the fourth TFT and a first driving transistor to be in the on state, and enabling the first TFT, the third TFT and the fifth TFT to be in the off state, thereby charging, by the data signal from the data line, the second end of the first storage capacitor to be at a potential equal to a difference between a potential of the data signal and a threshold voltage of the first driving transistor; and at a third stage of the time period, enabling the first TFT and the fifth TFT to be in the on state, and enabling the second TFT, the third TFT and the fourth TFT to be in the off state, thereby determining the light-emitting driving signal for the LED based on the data signal and the second signal, and driving the LED to emit light using the light-emitting driving signal.

* * * * *